Patented Oct. 14, 1952

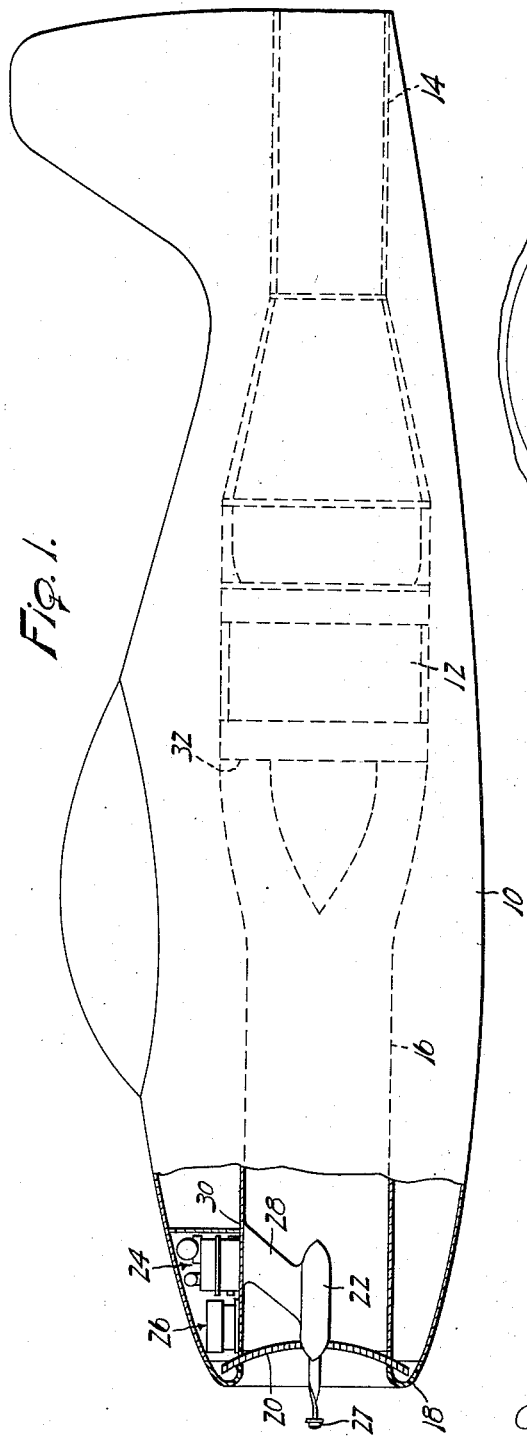
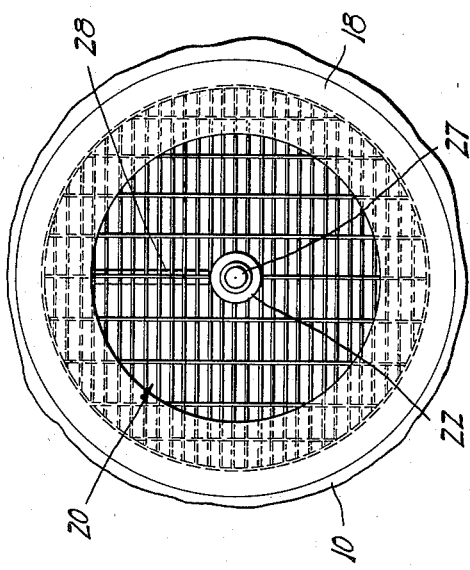

2,613,887

UNITED STATES PATENT OFFICE 2,613,887

AIRCRAFT WITH RADAR ANTENNA

Robert J. Woods, Grand Island, N. Y., assignor to Bell Aircraft Corporation, Wheatfield, N. Y.

Application January 7, 1949, Serial No. 69,703

6 Claims. (Cl. 244—1)

This invention relates to aircraft, and more particularly to improvements in jet engined aircraft radar antenna arrangements.

One of the objects of the invention is to provide an improved radar grid reflector type antenna mounting arrangement in aircraft.

Another object of the invention is to provide an improved radar antenna mount arrangement in jet engined type aircraft.

Another object of the invention is to provide an improved air duct and radar grid antenna arrangement in aircraft and the like.

Other objects and advantages will appear from the specification hereinafter.

In the drawings:

Fig. 1 is a side elevational view, partly in section, of an airplane embodying an air duct and radar antenna arrangement of the invention; and Fig. 2 is a fragmentary front elevation, on an enlarged scale, of the airplane and the radar antenna.

The invention is illustrated in the drawing in conjunction with an airplane including a fuselage 10 housing a turbo-jet engine 12 with tail pipe 14 and air inlet duct 16; but it will be understood that any other type jet engine may be similarly equipped, such as a ram-jet engine, or the like. The nose of the fuselage is formed by a sectionally streamlined cowling 18, the central opening of which is in continuation of the intake duct 16. A radar wave reflector antenna device 20 which is shaped generally to parabolic curve sectional form is centrally mounted upon the wave guide scanning mechanism 22 of a radar impulse transmitting and receiving apparatus, of which the power supply units and amplifier and range gear mechanism portions thereof are indicated generally at 24—26. The wave guide device is indicated at 27.

The scanning mechanism is housed within a streamlined casing and carried by means of a strut 28 extending downwardly into the air duct 16 from a mounting connection as indicated at 30 with a suitable portion of the fuselage frame structure. The parts are so arranged that the scanning mechanism is thereby mounted centrally of the air duct 16 and with the reflector structure concentric thereof. Preferably, the reflector structure will be of as large diameter as possible while remaining within the contours of the aircraft fuselage, and to this end the cowling portion 18 is formed of some suitable dielectric material such as plastic or the like so as to avoid "shielding" of any portion of the reflector apparatus.

In modern jet-engined aircraft the air intake ducts thereof are of such diameter as to render the system of the present invention particularly practicable, because a relatively large antenna may be thus installed without requiring additional fuselage frontal area or volume; and the reflector is thereby symmetrically located with respect to the adjacent aircraft frame structure with the most useful reflector area (which is near the center of the reflector) disposed in free air as distinguished from within a radome.

The reflector antenna 20 is of the grid type; that is, composed of series of intersecting plates arranged to reflect impulses from the scanning mechanism 22 so as to focus the projected impulses as required. Sweeping of the radar beam to provide scanning action may be accomplished either by moving the wave guide or the reflector, as is well known in the art. This grid-like structure of the antenna is adapted to function effectively as a screen through which the engine intake air must pass before traveling through the duct 16 to the engine 12; and thus the need of additional protective screening at the air intake ports of the engine, such as is conventionally furnished at the position indicated 32 in Fig. 1, is eliminated. Whereas, the description hereinabove has referred specifically to a "reflector" type antenna, it will be understood that any other type antenna may be mounted as explained; such as for example a "lens" type antenna.

Thus, the arrangement of the invention provides in combination, an efficient engine-air nose duct and protective screen, and an efficient radar reflector antenna; while at the same time avoiding the necessity of added nose shapes or increase in the overall frontal area of the aircraft. Also, it is noteworthy that the arrangement of the invention provides a radar antenna which is of unusually compact size, and which is simple to install and readily accessible for servicing purposes.

I claim:

1. In combination, a jet engine aircraft having an air duct receiving air at a leading portion of said aircraft and conveying the air to the aircraft jet engine, and a radar reflector antenna comprising a grid-like structure having a generally parabolic cross section and being disposed transversely of said air duct in the region of the intake end thereof and focused forwardly of said aircraft, the intake end of said air duct being substantially free from radar interfering elements, whereby said antenna is mounted so as to be substantially unobstructed for wave transmission and reception purposes, and whereby said antenna also functions as a screen for the intake air being delivered to said engine.

2. In a jet engine aircraft having an air duct receiving air at a leading portion of said aircraft for conveying the air to the jet engine, a radar reflector type antenna comprising a plurality of reflector plates arranged in the form of a grid-like structure of generally parabolic cross section disposed concentrically of said air duct to extend transversely thereof in the region of the intake end thereof, there being substantially no metallic elements of said aircraft interfering with the view forwardly of said antenna, whereby said antenna is mounted so as to be substantially unobstructed for wave transmission and reception purposes and whereby said antenna also functions as a screen for the intake air being delivered to said engine.

3. In a jet engine aircraft having an air duct receiving air at a leading portion of said aircraft and conveying the air to the jet engine, a radar impulse transmitting and receiving apparatus carried by said aircraft and including a radar reflector antenna comprising a parabolic sectionally shaped grid-like structure disposed concentrically of said air duct to extend transversely thereof in the region of the intake end thereof, there being substantially no metallic elements of said aircraft interfering with the view forwardly of said antenna.

4. In an aircraft having an air duct receiving air at a leading portion of said aircraft for conveying air to the mechanism interiorly of the aircraft, an ultra-high frequency electro-magnetic wave antenna comprising a grid-like structure having a focus and being disposed transversely of said air duct in the region of the intake end thereof, and an energy radiating element located substantially at said focus, whereby said antenna also functions as a screen for the air being delivered to said mechanism.

5. In combination, a jet engine aircraft having an air duct including a substantially unobstructed intake end portion and conveying air received therein to the aircraft jet engine, and a radar impulse transmitting and receiving unit carried by said aircraft and including a radar antenna comprising a grid-like structure having a focus and disposed within said air duct at the open intake end thereof and focused forwardly thereof.

6. In an aircraft, an air duct having an airstream intake portion for receiving and conveying air from exteriorly of the aircraft to the interior thereof, a directional antenna comprising a grid-like structure having a focus and disposed transversely of said air duct, whereby said antenna also functions as a screen for the air being delivered by said duct, and an energy radiating unit disposed substantially at said focus.

ROBERT J. WOODS.

REFERENCES CITED

The following references are of record in the file of this patent:

UNITED STATES PATENTS

| Number | Name | Date |
| --- | --- | --- |
| 2,230,261 | Peters et al. | Feb. 4, 1941 |
| 2,423,648 | Hansell | July 8, 1947 |
| 2,494,368 | Steele et al. | Jan. 10, 1950 |

FOREIGN PATENTS

| Number | Country | Date |
| --- | --- | --- |
| 449,148 | Great Britain | Mar. 15, 1935 |